US008861784B2

(12) United States Patent
Tojo

(10) Patent No.: US 8,861,784 B2
(45) Date of Patent: Oct. 14, 2014

(54) OBJECT RECOGNITION APPARATUS AND OBJECT RECOGNITION METHOD

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/774,207

(22) Filed: May 5, 2010

(65) Prior Publication Data

US 2010/0284568 A1 Nov. 11, 2010

(30) Foreign Application Priority Data

May 11, 2009 (JP) .................................. 2009-114898

(51) Int. Cl.
*G06K 9/00* (2006.01)
(52) U.S. Cl.
CPC ........ *G06K 9/00255* (2013.01); *G06K 9/00261* (2013.01)
USPC ............................ 382/103; 382/190; 382/107
(58) Field of Classification Search
CPC .... G06T 7/20; G06T 7/2073; G06K 9/00771; G06K 9/00785
USPC .................. 382/100, 103, 107, 190
See application file for complete search history.

(56) References Cited

U.S. PATENT DOCUMENTS

| | | | | |
|---|---|---|---|---|
| 5,301,239 A * | 4/1994 | Toyama et al. | ............... | 382/104 |
| 7,526,102 B2 * | 4/2009 | Ozer | .............................. | 382/103 |
| 7,903,901 B2 * | 3/2011 | Mitchell et al. | ............... | 382/265 |
| 8,150,194 B2 * | 4/2012 | Fujibayashi et al. | .......... | 382/260 |
| 8,280,234 B2 * | 10/2012 | Tanabe | ........................... | 386/343 |
| 8,284,991 B2 * | 10/2012 | Tojo et al. | ..................... | 382/103 |
| 8,488,901 B2 * | 7/2013 | Berestov et al. | .............. | 382/274 |
| 2005/0018879 A1 * | 1/2005 | Ito et al. | ........................ | 382/103 |

FOREIGN PATENT DOCUMENTS

| | | |
|---|---|---|
| JP | 4-199487 A | 7/1992 |
| JP | 2003-274390 A | 9/2003 |
| JP | 2005-129003 A | 5/2005 |
| JP | 2007-072626 A | 3/2007 |
| JP | 2008-141699 A | 6/2008 |

OTHER PUBLICATIONS

Rowley et al, "Neural network-based face detection", IEEE Transactions on Pattern Analysis and Machine Intelligence, vol. 20 , No. 1, Jan. 1998.

Viola and Jones, "Rapid Object Detection using Boosted Cascade of Simple Features", Proceedings of the IEEE Conference on Computer Vision and Pattern Recognition (CVPR'01).

* cited by examiner

*Primary Examiner* — Shefali Goradia

(74) *Attorney, Agent, or Firm* — Canon U.S.A., Inc. IP Division

(57) ABSTRACT

An object recognition apparatus recognizes an object from video data for a predetermined time period generated by a camera, analyzes the recognition result, and determines a minimum size and moving speed of faces of the video image recognized from the received frame image. Then, the object recognition apparatus determines a lower limit value of a frame rate and resolution from the determined minimum size and moving speed of the faces.

8 Claims, 10 Drawing Sheets

OBJECT RECOGNITION APPARATUS AND OBJECT RECOGNITION METHOD

BACKGROUND OF THE INVENTION

1. Field of the Invention

The present invention relates to an object recognition apparatus and an object recognition method, and more particularly, to a technique suitable for recognizing an object from a frame image captured by a camera or the like.

2. Description of the Related Art

Conventionally, there have been discussed techniques for measuring a number of persons, by shooting persons passing through an entrance of a shop or a corridor with a camera, and detecting positions of faces of human objects from a captured image. A technique for counting pedestrians in such a predetermined region from a camera video image is discussed in, for example, Japanese Patent Application Laid-Open No. 4-199487. According to this technique, counting is performed in such a manner that a camera is mounted at top of a corridor facing directly downward, and circular objects from camera images are extracted as human objects, based on the fact that shapes of heads of human objects viewed from above by the camera are circles.

On the other hand, in recent years, practical utilization of techniques for detecting faces from images has progressed, using such techniques as discussed in Rowley et al, "Neural network-based face detection", IEEE TRANSACTIONS ON PATTERN ANALYSIS AND MACHINE INTELLIGENCE, VOL. 20, No. 1, JANUARY 1998(hereinafter, referred to as NON-Patent Document 1) and Viola and Jones, "Rapid Object Detection using Boosted Cascade of Simple Features", Proceedings of the IEEE Conference on Computer Vision and Pattern Recognition (CVPR '01) (hereinafter, referred to as NON-Patent Document 2). With the utilization of such techniques, it is also possible to count human objects by mounting a camera facing human objects in a corridor, for example, and detecting faces from video images captured with a camera.

FIG. 8 illustrates a scene where a human object is captured with a camera, which is mounted facing the human object in a corridor.

In FIG. 8, a human object 103 is passing through the corridor with a ceiling 101 and a floor 102. A camera 104 is mounted on the ceiling 101, so that the human object 103 can be captured from obliquely above. A local area network (LAN) cable 105 transmits a video image captured by the camera 104. A personal computer (PC) 106 is an apparatus that analyzes the video image, and performs counting of human objects.

As illustrated in FIG. 8, it is also possible to count human objects by detecting a face of the human object 103 from the video image captured by the camera 104 mounted on the ceiling 101 using the techniques discussed in the above-described NON-Patent Documents 1 and 2. However, in order to recognize a human object with a high precision, a video image with a high resolution as well as a high frame rate is required. As a result, a load of a network when receiving video data from the camera eventually will become larger. Hereinbelow, descriptions will be given referring to examples illustrated in FIG. 5 and FIG. 6.

As illustrated in FIG. 5, when a human object 504 standing on a floor 502 of a corridor is at a position far from a camera 503 mounted on a ceiling 501 of the corridor, a human object 602 appears small at an upper part within a frame image 601, as illustrated in FIG. 6. Therefore, a video image with a high resolution is required for recognizing a human object that appears small.

On the other hand, when the human object is at a position far from the camera, an angle of the camera with respect to the human object is small. Consequently, it takes a long time for the human object to change the position within the frame image. In other words, a moving speed of the human object within the frame becomes relatively slow. Therefore, even if the frame rate is low, a recognition result will not be significantly varied.

On the other hand, as illustrated in FIG. 5, when the human object 505 standing on the floor 502 of the corridor is at a position near the camera 503, the human object 603 appears large at a lower part within the frame image 601, as illustrated in FIG. 6. Therefore, since the human object appears large, even a video image with relatively low resolution can be recognized. However, when the human object is not far from the camera, an angle of the camera with respect to the human object is large, and a position of the human object within the frame image changes significantly in a short time. Therefore, a video image with a high frame rate is required.

As described above, when a recognition target region 604 for a human object 602 is set, a video image with a high resolution, but a low frame rate can be used for recognition. Conversely, when a recognition target region 605 for a human object 603 is set, a video image with a high frame rate, but a low resolution can be used for recognition. However, to recognize the human object with a high precision without depending on a position of the human object within the frame image, it is necessary to satisfy the both conditions. Therefore, a video image with a high resolution and a high frame rate will be eventually required.

To solve these issues, a method for readily optimizing resolutions and frame rates depending on recognition target regions is needed. As such a method, a method for causing a user to designate a minimum detection size of the recognition target in a portable camera, and accordingly determining a resolution of an input image is discussed in, for example, Japanese Patent Application Laid-Open No. 2007-72606. The technique is effective in a case where a distance between the camera and the subject does not vary.

However, a distance between the camera and the subject varies at all times, in a case of a camera mounted in a corridor or the like and intended for monitoring or the like, as described above, necessary resolution is varied depending on a position of the subject within the frame image. In this case, the user needs to perform settings many times. Further, the entire frame image may be taken as a recognition target region, and an angle and a capturing magnification of the camera may be changed, so that the recognition target region coincides with the frame image region. Even in such a case, the need to reset the frame rate and the resolution will eventually arise, each time the angle of the camera and the capturing magnification are changed.

SUMMARY OF THE INVENTION

The present invention is directed to an object recognition apparatus and an object recognition method capable of reducing a load of a network, as well as readily optimizing frame rates and resolutions of input video images necessary for recognitions.

According to an aspect of the present invention, an object recognition apparatus includes an imaging unit configured to image a subject to generate video data, an object recognition unit configured to recognize an object from the video data generated by the imaging unit, and a determination unit configured to determine a control parameter of the imaging unit, based on a recognition result by the object recognition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2:
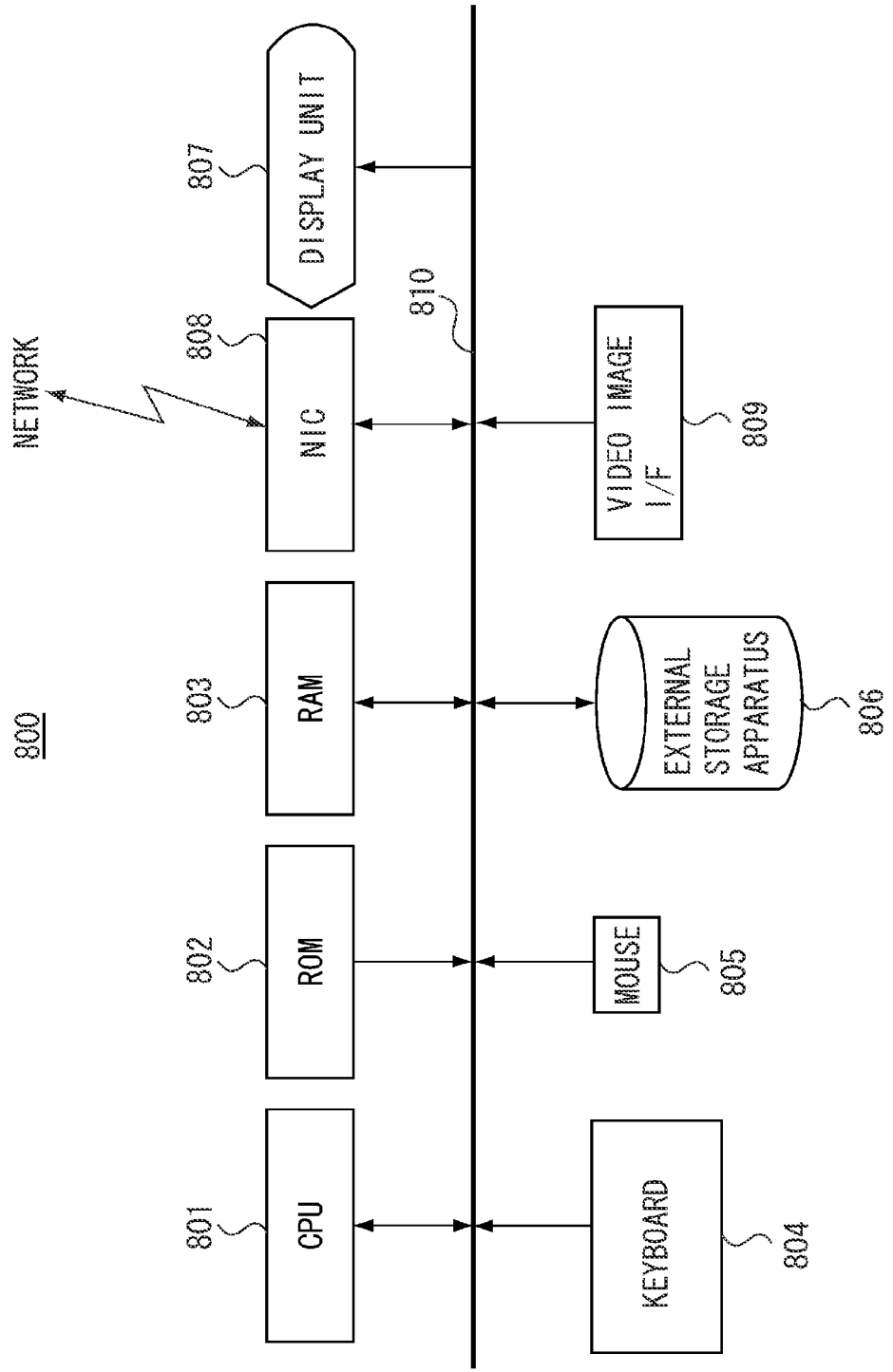
FIG. 2 is a block diagram illustrating a hardware configuration example of a personal computer (PC) according to the first exemplary embodiment.

FIG. 2 is a block diagram illustrating a hardware configuration example of a personal computer (PC) 800 according to the present exemplary embodiment.

In FIG. 2, a central processing unit (CPU) 801 executes various types of controls in the image processing apparatus according to the present exemplary embodiment. A read-only memory (ROM) 802 stores a boot program to be executed at the time of start-up of the image processing apparatus according to the present exemplary embodiment, and various types of data.

A random-access memory (RAM) 803 stores a control program for the CPU 801 performing processing, and provides a work area when the CPU 801 executes various types of controls as well. A keyboard 804 and a mouse 805 provide a user with various input operation environments.

An external storage apparatus 806 is a storage apparatus including a hard disk, flexible disk, an optical disk, a magnetic disk, a magneto-optical disk, and a magnetic tape as a medium. The external storage apparatus 806 is not always a necessary component, in a case where the control program and various types of data are all stored in the ROM 802.

A display unit 807 displays a processing result for a user. A network interface (NIC) 808 can perform communication with an imaging unit on a network via a LAN cable. A video interface 809 captures frame images from the imaging unit via a coaxial cable. A bus 810 connects the above-described components to one another.

Figure 1:
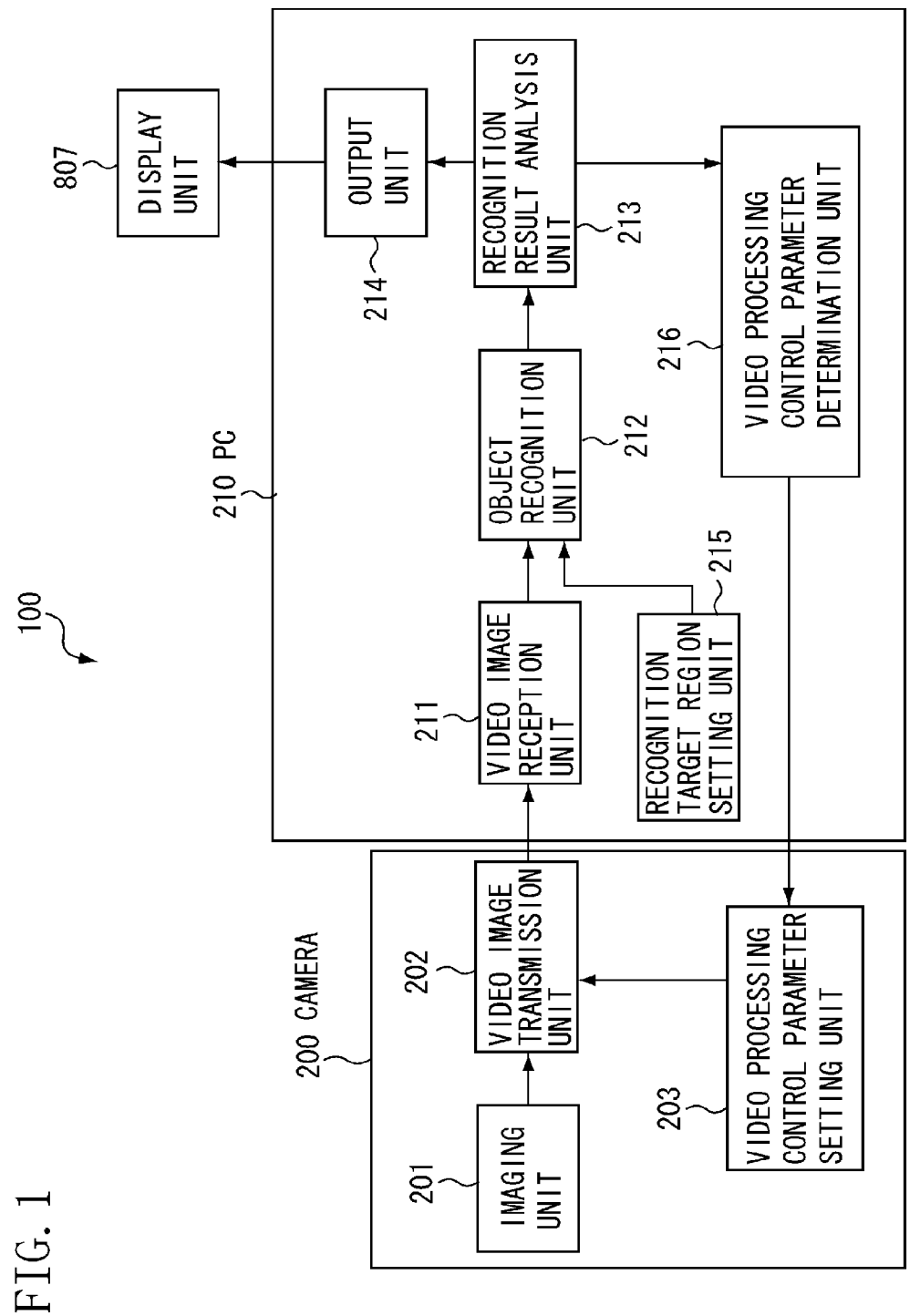
FIG. 1 is a block diagram illustrating a functional configuration example of an image processing apparatus according to a first exemplary embodiment.

FIG. 1 is a block diagram illustrating a functional configuration example of an image processing apparatus 100 according to the present exemplary embodiment.

In FIG. 1, an imaging unit 201 is composed of an imaging lens, and an imaging sensor such as a charge-coupled device (CCD) and a complementary metal-oxide-semiconductor (CMOS). A video image transmission unit 202 converts a frame image captured by the imaging unit 201 into image data (video data) with a predetermined frame rate and resolution, and sends it via the LAN cable to the PC 210 as packet data complied with the http protocol.

A video processing control parameter setting unit 203 receives information about the frame rate and resolution determined by a video processing control parameter determination unit 216, which will be described below, via the LAN cable, and sets the received value to the video image transmission unit 202. Thereby, the image data is transmitted according to the frame rate and the resolution determined in the video processing control parameter determination unit 216. As described above, a camera 200 according to the present exemplary embodiment includes the imaging unit 201, the video image transmission unit 202, and the video processing control parameter setting unit 203.

The video image reception unit 211 receives packet data, which has been sent from the camera 200, via the network interface 808 on the PC 210. Then, the video image reception unit 211 converts the received packet data into the frame image data, and outputs it to an object recognition unit 212.

The object recognition unit 212 recognizes whether a desired object appears on the image data that has been input to the video image reception unit 211. When a region is set by the recognition target region setting unit 215 as will be described, recognition is performed only on the region that has been set within the frame image. A recognition result analysis unit 213 analyzes a result recognized by the object recognition unit 212.

An output unit 214 performs control to output and display an analysis result by the recognition result analysis unit 213 to and on, for example, the display unit 807. The recognition target region setting unit 215 sets a region used for recognizing an object that is desired by the user within the frame image, via a keyboard 804, a mouse 805, and the like by the user's manipulation.

The video processing control parameter determination unit 216 determines a frame rate and resolution according to the analysis result by the recognition result analysis unit 213. Then, the video processing control parameter determination unit 216 transmits information about the determined frame rate and resolution to the camera 200 via the LAN cable. As described above, the PC 210 according to the present exemplary embodiment has the functions from the video image reception unit 211 to the video processing control parameter determination unit 216.

Next, a flow of the processing according to the present exemplary embodiment will be described below referring to a flowchart in FIG. 4. The present exemplary embodiment is applicable to a variety of applications for, not only counting a number of persons passing through a corridor, but also measuring a congestion ratio of a predetermined region, analyzing traffic lines, and issuing an alarm to a particular human object. Hereinbelow, an example in which the present exemplary embodiment is applied to counting a number of persons will be described.

Figure 4:
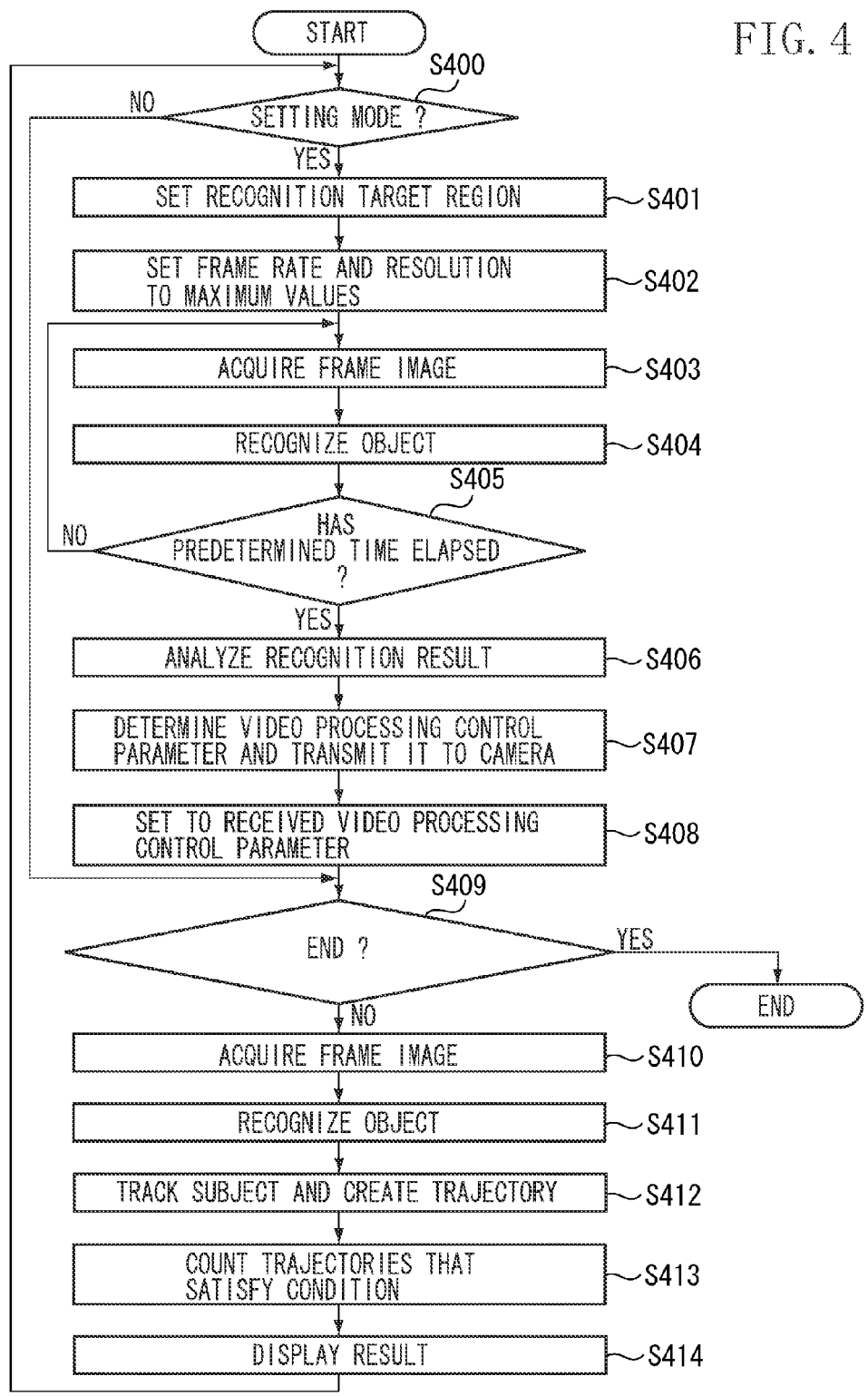
FIG. 4 is a flowchart illustrating an example of processing for object recognition by the image processing apparatus according to the first exemplary embodiment.
Figure 5:
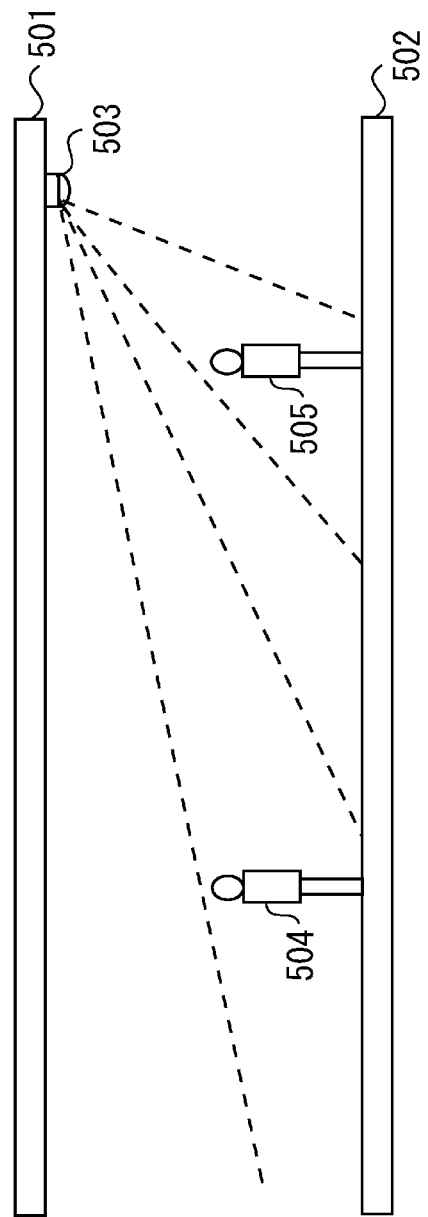
FIG. 5 illustrates a positional relation with a camera when a human object is far from the camera and a human object is close to the camera.

FIG. 4 is a flowchart illustrating an example of processing for object recognition by the image processing apparatus 100 according to the present exemplary embodiment.

A processing to be performed by the image processing apparatus 100 according to the present exemplary embodiment is divided broadly into a processing when a video processing control parameter is set and a processing when a number of persons is counted. First, a mode of setting a video processing control parameter is set, before starting to count the number of persons, such as after mounting a camera or when changing a recognition target region. Then, in the processing from step S401 to step S407, a processing on optimizing the frame rate and the resolution is performed. After that, the processing proceeds to a mode of counting a number of persons, and in steps from S410 to S413, a processing for counting the number of persons is performed.

In step S400, the video processing control parameter determination unit 216 determines whether a mode for setting a video processing control parameter is set. If a mode for setting the video processing control parameter is not set (NO in step S400), then the processing proceeds to step S409. In this process, the mode of setting the video processing control parameter is generally a mode for performing initial setting for counting the number of persons.

Figure 6:
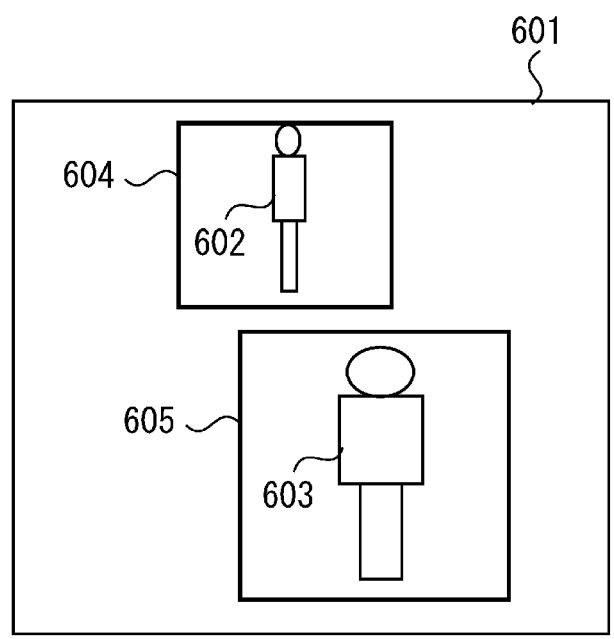
FIG. 6 illustrates a recognition target region within a frame image.

On the other hand, in step S400, if a mode of setting the video processing control parameter is set (YES in step S400), then in next step S401, the recognition target region setting unit 215 sets a recognition target region within the frame image. Specifically, a rectangular region, as illustrated in FIG. 6, is designated within the frame image by a user manipulating a keyboard 804 or a mouse 805.

In the present exemplary embodiment, descriptions will be given below on the assumption that only one rectangular region is designated. Then, the recognition target region setting unit 215 sets the designated rectangular region as a recognition target region in the object recognition unit 212.

Next, in step S402, the video processing control parameter determination unit 216 sets a frame rate and resolution to a highest available value, as an initial value. The value is determined depending on a size of charge-coupled device (CCD) of the imaging unit 201, a transmission capability of the video image transmission unit 202, or a band-width of the network.

As a specific determination method, firstly, an inquiry is made to the camera 200 via the network, and information about the resolution and frame rate available by the camera 200 is obtained. Next, information about the resolution and frame rate is transmitted to the video processing control parameter setting unit 203 via the network. Then, the video processing control parameter setting unit 203 controls the video image transmission unit 202 so that the frame rate and resolution become the highest available value. As a result, hereinafter, a frame image with the highest values of the frame rate and resolution will be generated.

Next, in steps from S403 to S405, recognition of a human object is performed for a predetermined time. At this time, it is assumed that a human object being a subject walks in a predetermined pattern within the designated recognition target region. For example, the human object walks back and forth repeatedly and moves from top end to bottom end of the recognition target region of the frame image. This is to facilitate an analysis of the recognition result by arranging a content of recognition in advance.

Next, in step S403, the video image reception unit 211 receives image data captured by the imaging unit 201 of the camera 200 from the video image transmission unit 202, and sends it to the object recognition unit 212. In this process, the image data to be input is data of two-dimensional array composed of, for example, 8-bit pixels, which is composed of three faces of R, G, and B.

The video image reception unit 211, when image data is compressed, for example, by a joint photographic experts group (JPEG), decompresses the image data according to a predetermined decompression method, into the image data composed of respective RGB pixels. Furthermore, according to the present exemplary embodiment, RGB data is converted into luminance data, and is stored in an image memory (not illustrated). The luminance data will be used for subsequent processing. In a case where data of YCrCb is input as the image data, Y-component may be used as the luminance data as it is.

Next, in step S404, the object recognition unit 212 compares image data transferred into an internal image memory with dictionary data, to recognize a desired object with respect to a region set by the recognition target region setting unit 215.

Now, an object recognition method will be described below. As described above, the object recognition method is discussed in, for example, the NON-Patent Document 1 and the NON-Patent Document 2. Hereinbelow, descriptions will be made as that an object is recognized from the entire area of an image, in order to simplify the description. However, in a case of recognizing an object only from the recognition target region, basic processing is similar thereto. In this case, it is only necessary to perform scanning operation described below on only the recognition target region, or to segment the recognition target region from the frame image, and then perform scanning operation on the entire segmented image.

For example, according to the method discussed in NON-Patent Document 1, a face pattern in an image is detected by the neural network. The method will be briefly described below. First, image data targeted for face detection is written into a memory, and a predetermined region to be compared with the face is segmented from the image. Then, one piece of data is output by inputting pixel value distribution of the segmented region and using arithmetic operations by the neural network.

At this time, weights and threshold values of the neural network are learned in advance by using a huge volume of face image patterns and non-face image patterns. For example, if output data of the neural network is equal to or greater than 0, it is discriminated as a face, otherwise as a non-face. In this case, the weights and the threshold values will serve as the above-described dictionary data.

Figure 7:
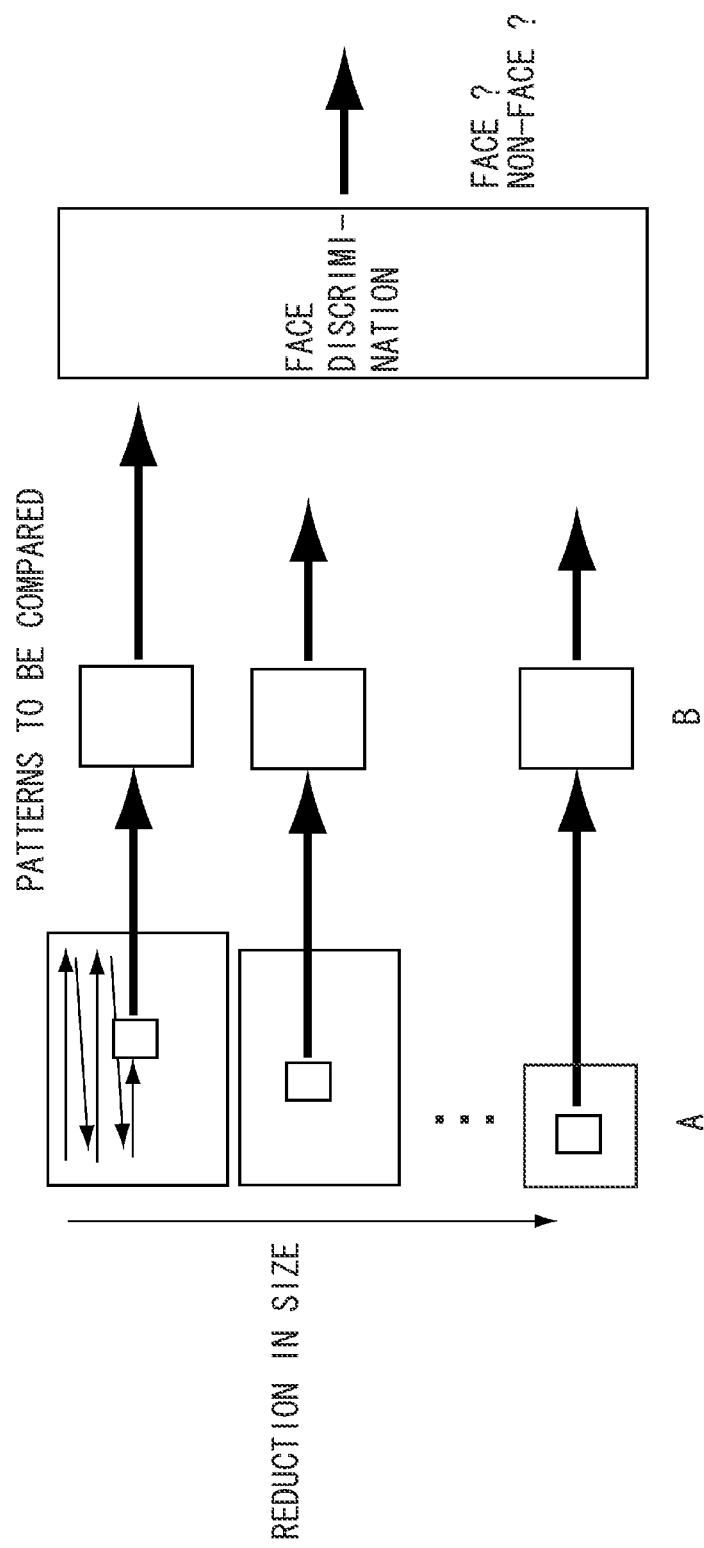
FIG. 7 illustrates a method for performing searches for face patterns from images.
Figure 8:
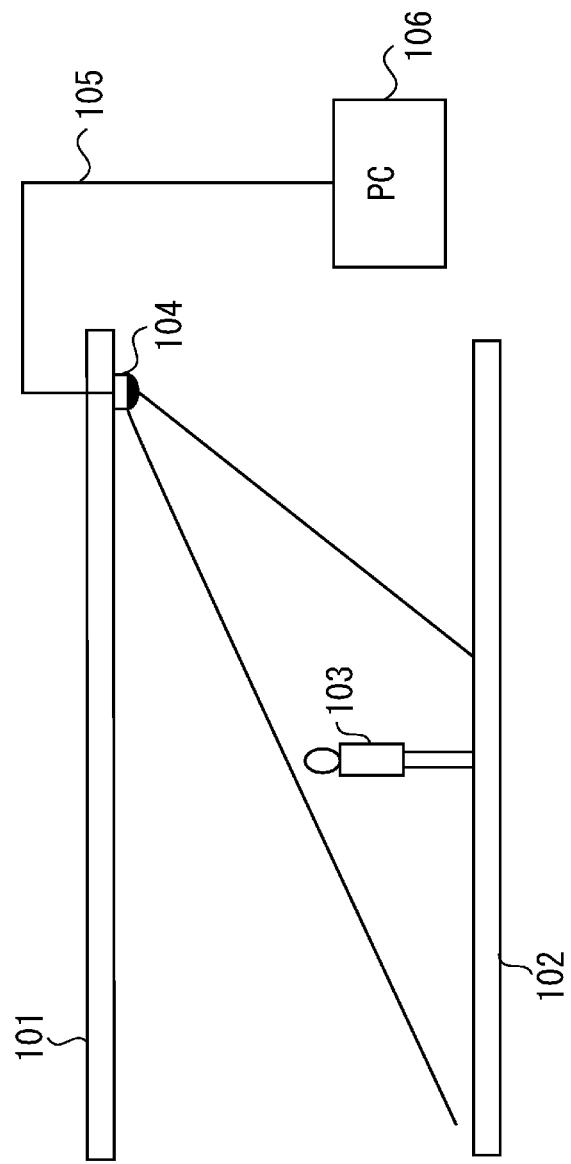
FIG. 8 illustrates a scene where a human object is captured with a camera mounted at obliquely above in a corridor.

Then, by scanning segmentation positions of the image patterns to be compared with the face by the neural network, the face can be detected from the image. The scanning operation is performed horizontally and vertically in sequence throughout the image in such a manner, for example, as illustrated in FIG. 7. In addition, in order to detect various size faces, as illustrated in "A" column in FIG. 7, a read-out image is reduced in size step by step in a predetermined percentage, and the scanning operation of the face detection described above is performed for each of the reduced images.

An example for speeding up the processing is discussed in, for example, the Patent Document 2. In a method discussed in the Patent NON-Document 2, accuracy of face discrimination is improved by effectively combining many weak discriminators using AdaBoost algorithms. Furthermore, each weak discriminator is composed of a rectangular Haar-type feature amount. Besides, when the rectangular feature amount is calculated, the calculation is performed at a high speed using integrated image.

Furthermore, discriminators obtained through the AdaBoost learning are connected in series, so as to constitute a cascade face detector. In the cascade-type face detector, first, candidates of apparently non-face pattern are removed on the spot using simple discriminators having less computational complexity at previous stages. Then, determination of face or non-face is performed only on other candidates, using complex discriminators having more computational complexity and higher discrimination performance at subsequent stages. In this way, since there is no need to perform complicated determination for all candidates, the speedup of the processing can be achieved.

Next, in step S405, the recognition result analysis unit 213 determines whether a predetermined time has elapsed. If the predetermined time has not elapsed (NO in step S405), the processing returns to step S403. On the other hand, if the predetermined time has elapsed (YES in step S405), the processing proceeds to step S406.

Next, in step S406, the recognition result analysis unit 213 analyzes the recognition result for the predetermined time, and determines a minimum size of the faces, and a moving speed in a video image recognized by the object recognition unit 212 from a frame image received by the video image reception unit 211. Regarding the minimum size of the faces, a histogram is created for sizes of the faces based on the recognized result within the predetermined time, and a size having a frequency of a predetermined number or more is adopted as the minimum size, as viewed in increasing order of the sizes of faces.

On the other hand, regarding a moving speed of the face, it is only necessary to determine a positional difference of the recognized face (distance (number of pixels)) between two frames. A time between two frames can be known from a frame rate. In this process, for eliminating variation of accuracy of position of the recognized face, the moving speeds are calculated by the above-described method for the predetermined time, and an average value thereof is adopted as the moving speed of the face.

Next, in step S407, the video processing control parameter determination unit 216 determines a lower limit value of the frame rate and the resolution, from the minimum size and moving speed of the face determined in step S406.

The lower limit value of resolution is determined by a recognizable minimum size. As illustrated in FIG. 7, image patterns to be used for matching have a predetermined size, and various size faces are recognized by reducing the size of the image to be scanned. Therefore, a size of the image pattern of the top image (size before reduction operation) in A column in FIG. 7 is a recognizable minimum size.

For example, a case where an image pattern to be used for matching is 20×20 pixels will be described below. When a resolution of the frame image is a video graphics array (VGA) (640×480 pixels), the minimum size of the recognizable face is 20×20 pixels. In this case, a minimum size of faces obtained in step S406 is assumed to be 40×40 pixels. Since minimum height and width of the obtained face are twice the height and width of the image pattern to be used for matching, a resolution of the frame image is enough, if the height and width of the VGA image are ½ respectively. Therefore, the required lower limit value of the resolution of the frame image can be determined to be quarter video graphics array (QVGA) (320× 240 pixels).

Next, a lower limit value of the frame rate is determined according to the moving speed of the face within the frame image obtained in step S406, and a permissible range of positional displacement of the recognition results between a frame and the subsequent frame thereof. To count a number of persons, it is necessary to create a trajectory for each of identical human objects from the recognition results for respective frames. That is, it is necessary to determine whether the recognition results between the preceding and succeeding frames are the faces of identical human objects. For example, when the recognition results (subject) between the preceding and succeeding frames are not overlapped, it is difficult to determine whether they are the same faces. Thus, the positional displacement within the range where the recognition results of the preceding and succeeding frames are overlapped can be adopted as a permissible range.

A case where a minimum size of the faces obtained in step S406, for example, within the frame image of VGA is 40×40 pixels will be described below. At this time, it is assumed that a moving speed is 10 pixels at 30 fps (frames per second). As described above, since QVGA is sufficient as the resolution, a moving speed at this time is 5 pixels at 30 fps. At this time, since a size of the recognizable face is 20×20 pixels, if two recognition results are displaced by equal to or greater than 20 pixels, which is equivalent to one side of the recognizable face size, they are not overlapped.

Figure 9:
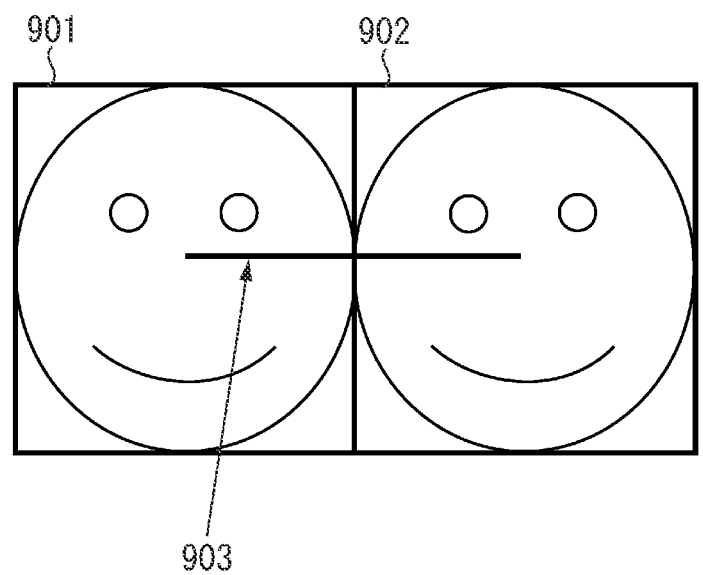
FIG. 9 illustrates an example where recognition results of faces are not overlapped in preceding and succeeding frames

For example, as illustrated in FIG. 9, there are two recognition results 901 and 902, and a distance 903 is a distance between two centers thereof. The distance 903 is 20 pixels since it is equivalent to twice of 10 pixels (i.e., half of one side). In other words, if the two successive frames are displaced from each other by equal to or greater than 20 pixels, the recognition results are not overlapped with each other. Therefore, a range of permissible positional displacement is to be 15 pixels. Since the moving speed is 5 pixels at 30 fps, the moving speed is 15 pixels for 10 fps. As a result, a lower limit value of necessary frame rate is 10 fps.

Then, the video processing control parameter determination unit 216 transmits information about values of the determined resolution and frame rate (lower limit values) to the video processing control parameter setting unit 203 of the camera 200 via the network.

Next, in step S408, the video processing control parameter setting unit 203 sets a parameter of the video image transmission unit 202 to transmit the image data of the frame rate and resolution determined in step S407. Consequently, hereinafter, the image data captured by the imaging unit 201 is transmitted by the video image transmission unit 202 at the frame rate and resolution determined by the video processing control parameter determination unit 216.

Next, in step S409, it is determined whether an instruction of termination has been given by a user via power supply OFF, a keyboard 804, or a mouse 805. If the instruction of termination has been given (YES in step S409), the processing is terminated. If, on the other hand, the instruction of termination has not been given (NO in step S409), the processing proceeds to step S410.

Next, in step S410, the video image reception unit 211 receives the image data with the frame rate and resolution determined in step S407, and sends it to the object recognition unit 212. Then, in step S411, the object recognition unit 212 performs object recognition on the image data, which has been input in step S410. The details of the object recognition are the same as that in step S404, and descriptions thereof will be omitted.

Next, in step S412, the recognition result analysis unit 213 adds up subject regions detected during the predetermined time, and generates trajectories of human objects. Information about the subject regions detected during the predetermined time is to be stored in RAM 803. Through this processing, the recognition result analysis unit 213 determines which corresponds to a movement of the identical human object, out of a plurality of faces detected within the predetermined time.

Figure 3:
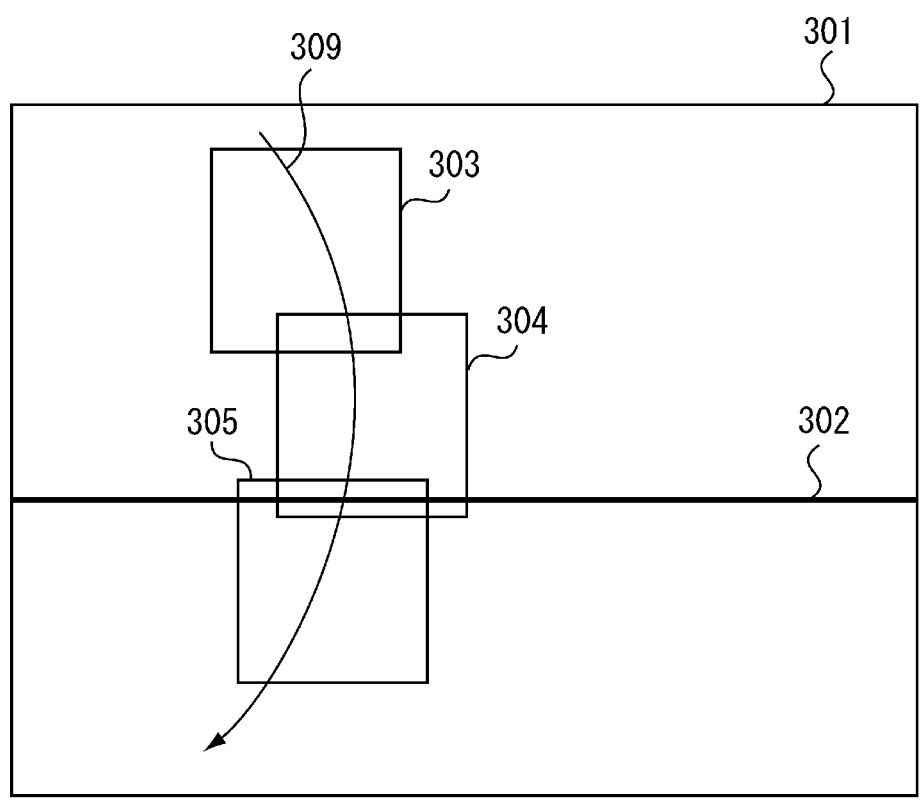
FIG. 3 illustrates a movement example of a subject region along with a movement of a subject.

The details of the processing in step S412 will be described below referring to FIG. 3. FIG. 3 illustrates a movement example of the subject regions due to a movement of a subject.

In FIG. 3, a plurality of the subject regions detected within the predetermined time are represented in an overlapped manner by rectangles in an entire frame 301 that is being imaged. In the example illustrated in FIG. 3, three frames are overlapped, and a region 303 is a subject region of an oldest frame, a region 304 is a subject region of the next oldest frame, and a region 305 is a subject region of the newest frame (current frame).

As a method for obtaining a trajectory of these regions, it is only necessary to obtain the centers of the respective regions, and connect them by a line segment, by regarding the subjects in which a distance between the centers of respective regions are a minimum as an identical subject. The thus obtained trajectory is, for example, a curve 309 in FIG. 3.

Next, in step S413, the recognition result analysis unit 213 checks if the trajectory created in step S409 satisfies a predetermined condition, and counts a number of trajectories that satisfy the condition. In the present exemplary embodiment, a predetermined condition refers to, for example, as illustrated in FIG. 3, whether a trajectory crosses over a measurement line 302. The measurement line 302 is set within a frame screen by the user.

In the example illustrated in FIG. 3, since the curve 309 crosses over the measurement line 302, it is counted as one. If a trajectory that has not yet crossed over the measurement line 302 exists, it is not counted at that time point.

Next, in step S414, an output unit 214 outputs information about the counted result on an display unit 807, and displays it for the user. Then, the processing returns to step S400. As described above, it becomes possible to reduce a load of the network, and to easily optimize the frame rates and resolutions of video images necessary for recognition, by analyzing recognition results for the predetermined time, and determining a minimum size and moving speed.

In the present exemplary embodiment, an example of detecting positions of faces has been described, but it may be various areas of a human object such as a whole human body and upper body, head, and a wide variety of objects such as an automobile and a bicycle. In addition, in the present exemplary embodiment, optimization of the resolution and frame rate has been performed, when initial setting of the image processing apparatus is performed (when a camera is mounted or when a detection target region is changed), but it is not limited thereto.

For example, in step S414 in FIG. 4, the resolution and frame rate may be optimized while counting a number of persons. Specifically, it is only necessary to set to a maximum frame rate and resolution when counting of the number of persons is started, and to determine a minimum size and moving speed when counting is performed in the recognition result analysis unit 213.

At a timing at which the minimum size and moving speed have been determined, the video processing control parameter determination unit 216 may determine the frame rate and resolution, and may transmit the information to the video processing control parameter setting unit 203.

Furthermore, in the present exemplary embodiment, an example of setting only one recognition target region has been described, but a plurality of the recognition target regions may be set. In this case, first, the frame rate and resolution in respective setting regions are determined. Next, it is only necessary to compare a total video image transmission amount when sent as each separate video image stream with a total video image transmission amount when sent as one video image stream, and select whichever having less amount.

When sent as one video image stream, it is only necessary to select the frame rate and the resolution, which have the greatest values, out of the frame rates and resolutions each exist for each setting region.

In the present exemplary embodiment, the recognition target region has been set by designation operation of the user, but may be set from the recognition results of the object recognition unit 212. For example, the frame rate and the resolution are set to maximum values respectively, and the object recognition is performed for the predetermined time. After that, it is only necessary to obtain a region where the predetermined number or more recognition results exist, and to set the region as a recognition target region.

In the first exemplary embodiment, video image transmission quantity (network load) on the network has been reduced by connecting the camera 200 and the PC 210 via the network, and determining lower limit values of the frame rates and resolutions in a range where face recognition is possible. In the second exemplary embodiment, an example of performing object recognition and recognition result analysis within the camera will be described below.

Figure 10:
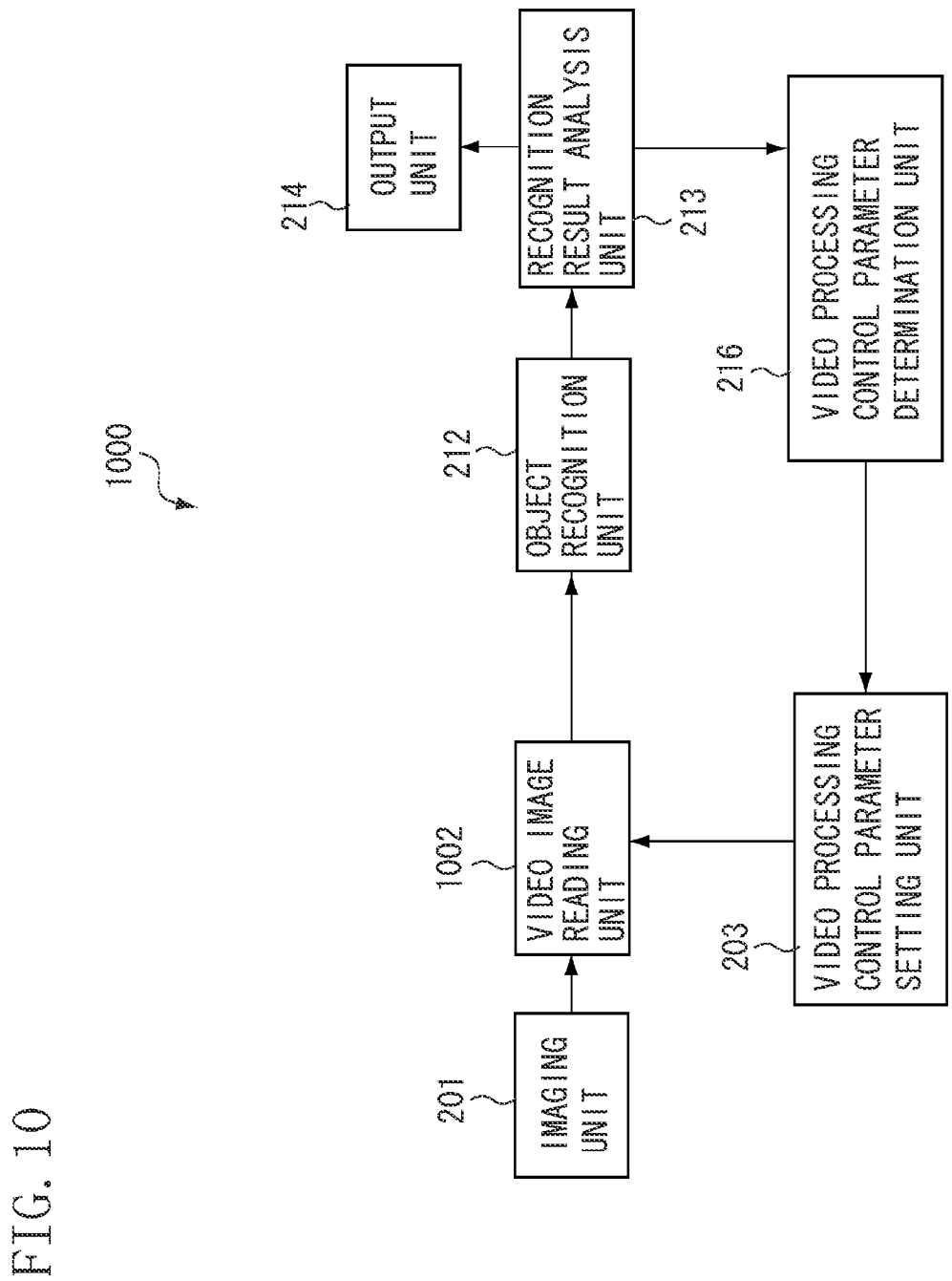
FIG. 10 is a block diagram illustrating functional configuration example of an image processing apparatus according to a second exemplary embodiment.

FIG. 10 is a block diagram illustrating a functional configuration example of an image processing apparatus 1000 according to the second exemplary embodiment. The same reference numerals as those in FIG. 1 are designated to the similar configuration as that in FIG. 1. Therefore, descriptions of the similar configuration as that in FIG. 1 will be omitted.

In FIG. 10, the video image reading unit 1002 reads out pixel signals generated by the imaging unit 201. The video image reading unit 1002 reads out image signals of arbitrary regions by controlling pixel signals read out from an image sensor of the imaging unit 201 for each pixel, and performs video processing such as zooming if needed. Further, the video image reading unit 1002 forms the image data from a plurality of the pixel signals that have been read out, and outputs the image data to the object recognition unit 212 at the predetermined time interval.

In particular, in a case where the image sensor of the imaging unit 201 has a high resolution, a circuit scale of the video image reading unit 1002 will be huge to read out all pixels at one time. Then, when recognition processing is performed on the image data with extremely high resolution, a number of times to perform matching will eventually become huge, and as a result of which processing time will eventually become very long.

Thus, the image sensor is divided into a plurality of regions, and for each of the divided regions, similarly to steps from S402 to S405 in FIG. 4, the object recognition is performed by the object recognition unit 212, for a predetermined time, by inputting the image data having high resolution and frame rate. Then, similarly to step S406, the recognition result analysis unit analyzes the object recognition results for the predetermined time, and determines a minimum size and moving speed of the recognized objects. Then, based on the determined minimum size and moving speed, similarly to step S407, it is only necessary to determine the frame rate and the resolution to be optimized by the video processing control parameter determination unit 216.

The determined frame rate and resolution are set for the video image reading unit 1002 by the video processing control parameter setting unit 203. Then, the video image reading unit 1002 converts the image data into that with the optimized frame rate and resolution, and outputs the image data to the object recognition unit 212. Accordingly, both an increase of circuit scale necessary for reading out, and an increase of recognition processing time can be suppressed.

According to the exemplary embodiments described above, in cameras or the like intended for surveillance or the like, even when a distance between a camera and a subject varies at all times, a load of the network can be reduced, and the frame rate and resolution of input video image necessary for the recognition can be easily optimized.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-114898 filed May 11, 2009, which is hereby incorporated by reference herein in its entirety.

What is claimed is:

1. An object recognition apparatus comprising:
   an imaging unit configured to capture a moving image based on a frame rate to generate video data;
   an object recognition unit configured to recognize an object from the video data generated by the imaging unit;
   a recognition result analysis unit configured to estimate a positional displacement between frames for estimating a moving speed of the object recognized by the object recognition unit; and
   a determination unit configured to determine a lower limit value of the frame rate to be used for generating succeeding video data by the imaging unit based on the moving speed estimated from the positional displacement between frames estimated by the recognition result analysis unit.

2. The object recognition apparatus according to claim 1,
   wherein the object recognition unit recognizes the object from the video data for a predetermined time period generated by the imaging unit, and
   wherein the determination unit determines the frame rate of the imaging unit based on the moving speed of the object in the video data for the predetermined time estimated by the recognition result analysis unit.

3. The object recognition apparatus according to claim 1,
   wherein the recognition result analysis unit further estimates a size of the object recognized in the video data from the object recognition unit, and
   wherein the determination unit further determines the resolution of the video data generated by the imaging unit based on the size of the object estimated by the recognition result analysis unit.

4. The object recognition apparatus according to claim 3, wherein the determination unit determines a lower limit value of the resolutions based on a minimum size of the object estimated by the recognition result analysis unit.

5. The object recognition apparatus according to claim 1, further comprising a designating unit configured to designate a recognition target region in the video data,
   wherein the determination unit determines the frame rate based on an object recognition result in the recognition target region designated by the designating unit.

6. The object recognition apparatus according to claim 1, further comprising a setting unit configured to set a highest value available as an initial value of the frame rate.

7. An object recognition method comprising:
   capturing a moving image based on a frame rate to generate video data;
   recognizing an object from the generated video data;
   estimating a positional displacement between frames for estimating a moving speed of the recognized object; and
   determining a lower limit value of the frame rate to be used for generating succeeding video data, based on the estimated moving speed from the estimated positional displacement between frames of the recognized object.

8. A non-transitory computer-readable storage medium storing a program that causes a computer to execute an object recognition method, the method comprising:
   capturing a moving image based on a frame rate to generate video data;
   recognizing an object from the generated video data;
   estimating a positional displacement between frames for estimating a moving speed of the recognized object; and
   determining a lower limit value of the frame rate to be used for generating succeeding video data, based on the estimated moving speed from the estimated positional displacement between frames of the recognized object.

* * * * *